United States Patent [19]

Sell

[11] Patent Number: 4,759,745
[45] Date of Patent: Jul. 26, 1988

[54] REMOTE LUBRICATION SYSTEM FOR HYDROSTATIC DRIVE

[75] Inventor: Leslie J. Sell, Langley, Canada

[73] Assignee: PACCAR of Canada Ltd., Surrey, Canada

[21] Appl. No.: 494,566

[22] Filed: May 13, 1983

Related U.S. Application Data

[63] Continuation of Ser. No. 251,378, Apr. 6, 1981, abandoned.

[51] Int. Cl.$^4$ ............................................. F16N 7/40
[52] U.S. Cl. .................................................... 60/456
[58] Field of Search ............. 187/17; 91/46; 137/565, 137/443, 448, 434; 60/39.08, 336, 339, 419, 456, 486, 714, 325

[56] References Cited

U.S. PATENT DOCUMENTS

| | | | |
|---|---|---|---|
| 2,232,620 | 2/1941 | Meeks | 60/473 |
| 2,263,142 | 11/1941 | Pratt | 137/448 |
| 2,550,441 | 4/1951 | Barling | 137/443 |
| 3,095,896 | 7/1963 | Ross | 137/448 |
| 3,486,582 | 12/1969 | Carter et al. | 60/39.08 |
| 4,170,873 | 10/1979 | Milo | 60/39.08 |
| 4,321,793 | 3/1982 | Uranaka et al. | 60/456 |

Primary Examiner—Deborah L. Kyle
Assistant Examiner—Richard L. Klein
Attorney, Agent, or Firm—Seed and Berry

[57] ABSTRACT

A fluid motor is connected to a winch at a remote distance from a hydrostatic pump; a scavenge pump is driven by a motor powered by part of the main drive fluid and maintains a lubrication level of fluid also taken from the main drive fluid in the transmission sump at a sufficient level to prevent air contamination of the main drive fluid.

11 Claims, 1 Drawing Sheet

REMOTE LUBRICATION SYSTEM FOR HYDROSTATIC DRIVE

This application is a continuation of U.S. patent application Ser. No. 251,378, filed Apr. 6, 1981, now abandoned under C.F.R. §1.62.

DESCRIPTION

1. Technical Field

This invention pertains to lubrication systems and hydrostatic drive systems where the motor driven by the hydrostatic pump may be at a remote location from the pump and the power fluid is also used at the remote location as a lubrication fluid.

2. Background Art

The oil in a hydrostatic drive system has frequently been used as a lubrication fluid for the transmission of a winch. Generally, this occurs, however, where the pump, motor and winch transmission are all physically located close to one another so that gravity flow can be used to return the fluid after lubrication back to the pump reservoir. Where the distances begin to increase between the sump for the lubrication system and the reservoir for the pump, however, a scavenging pump is employed to pump the fluid from the lubrication sump back to the reservoir. When distances between this sump and the reservoir increase, the balance between the scavenge pump, the sump oil, and the reservoir oil becomes increasingly critical. One difficulty is that air contamination can occur by which air gets sucked into the oil by the scavenge pump, undesirably affecting the hydrostatic drive system. Furthermore, the fluid removed from the main power system for lubrication is also potentially usable for transmission valve controls, such as for operating clutches to change speed ratios, etc., and it is important that the interrelationship between the fluid pressures necessary to return the oil from the lubrication sump to the main pump reservoir not affect the pressure levels available to the valve controls so as not to inadvertently actuate a clutch.

DISCLOSURE OF THE INVENTION

It is an object of this invention to provide a lubrication system from a hydrostatic drive fluid at a location remote from the hydrostatic pump and to return the oil from the lubrication system to the hydrostatic pump without air contamination.

It is another object of this invention to provide an improved lubrication system utilizing oil from a main pump in a hydrostatic drive system for returning the oil used for lubrication to the hydrostatic pump without interfering with pressure levels on the valve control components of the drive.

Basically, these objects are obtained by driving a scavenge unit from a reduced flow of the hydrostatic drive fluid from the pump, driving a scavenging pump from the scavenging motor, directing the oil from the scavenge motor to the lubrication system of the transmission, collecting the used lubrication oil in a sump and providing control means at the sump for maintaining the discharge line from the sump to the main pump reservoir free of contaminating air. In the preferred embodiment, the control means is a float which determines the amount of oil at the discharge line of the scavenge pump which can be diverted to the reservoir or to the sump to maintain the level of oil in the sump above the sump discharge line which is positioned at the lower point in the sump. Also in the preferred embodiment, the transmission control clutches are also powered from this lubrication fluid prior to its being directed to the lubrication ports of the transmission.

BEST MODE FOR CARRYING OUT THE INVENTION

Figure 1:
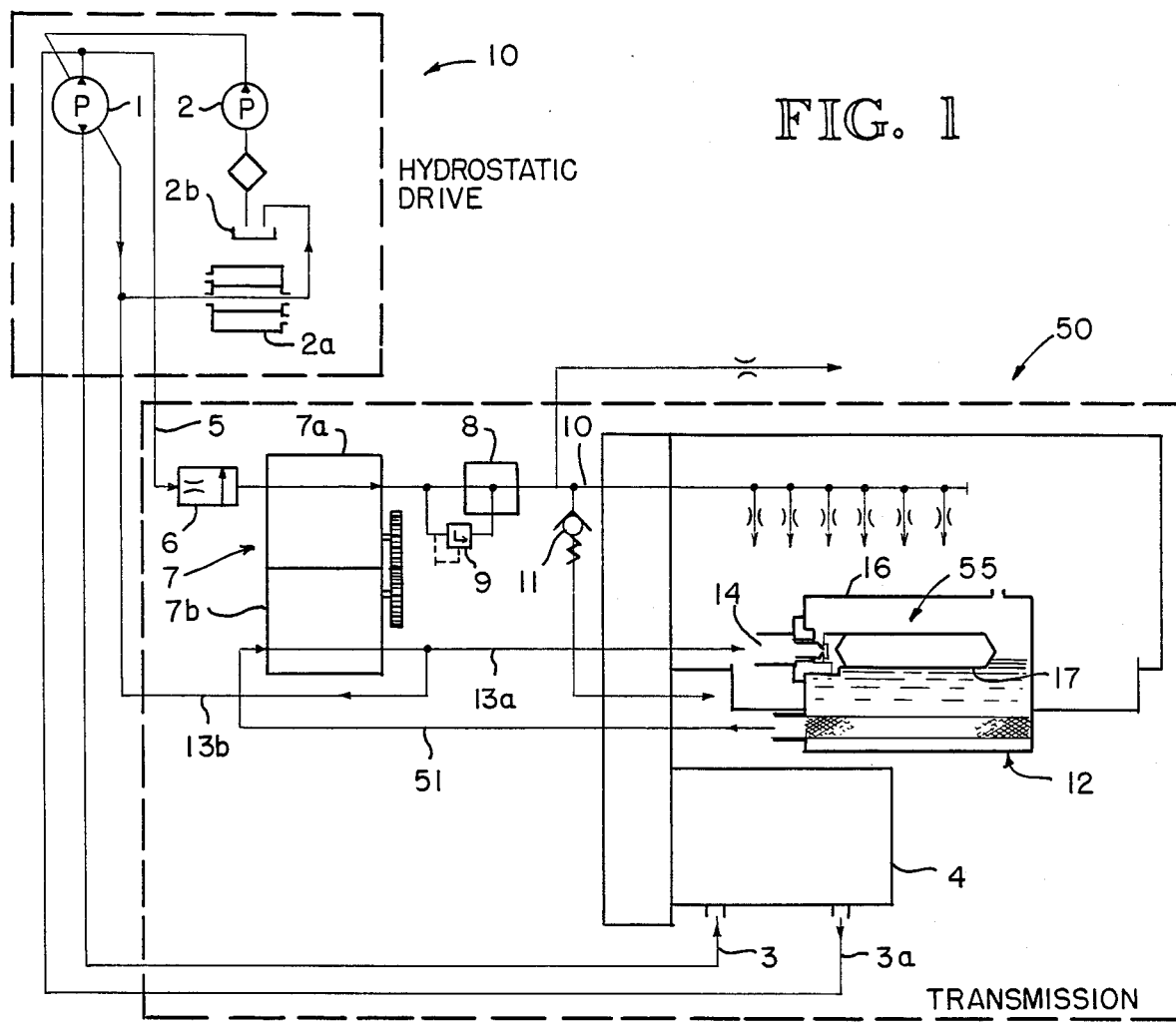
FIG. 1 is a schematic illustration of a hydrostatic drive and lubrication system employing the principles of the invention.
Figure 2:
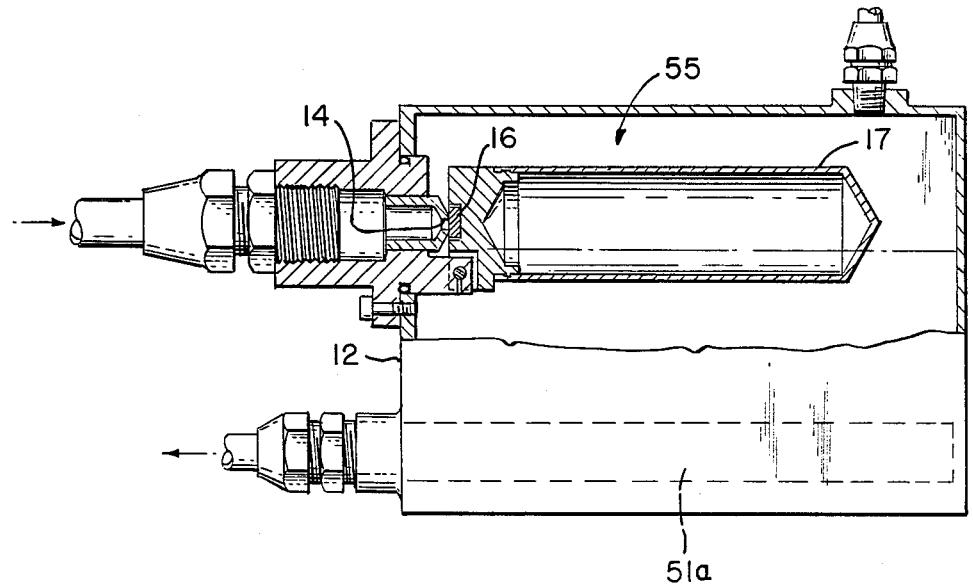
FIG. 2 is a schematic illustration of a sump used in the device of FIG. 1.

A hydrostatic drive system 10 includes a variable pump 1 and a charge pump 2 which are driven directly by the prime mover. Hydraulic lines 3 and 3a connect to a remote hydraulic motor 4, the output shaft of which is connected to the winch transmission 50. It should be understood that the motor and transmission may be from 25–50 feet away from the pump.

An oil supply or bypass line 5 is tapped off the high-pressure line 3a and is connected to a 2-gpm, for example, flow control valve 6. The normal high-pressure flow in line 5 is approximately 80 gpm so that the flow control 6 substantially reduces the flow of the oil.

The outlet of the flow control is connected to a motor section 7a of a scavenge unit 7. The oil, in passing from the inlet to the outlet of the motor section 7a, causes the motor to turn and drive a mechanically coupled pump section 7b. Oil leaving the motor section 7a then passes to the inlet of a clutch valve sub-plate 8. Pressure at the inlet of the sub-plate is limited to approximately 350 psi by relief valve 9. The clutch valve sub-plate provides oil pressure available to the clutch controls for operating the various clutch components of a typical transmission in a winch.

All oil coming from the clutch valve sub-plate and the relief valve 9 is collected together and passed to a lubrication line 10. The oil in the lubrication line 10 is divided and passed through the various areas of the winch transmission to be lubricated, with a portion of the oil passing over pressure relief valve 11 which limits the lubricating oil pressure to a desired 20 psi. Thus all of the original oil returns to the transmission sump 12, either through the pressure relief valve 11 or draining directly from the lubrication of the transmission. A discharge line 51 couples the lower end of the sump via filter 51a to the inlet of the scavenge pump 7b. The outlet of the scavenge pump is connected to a reservoir return line 13b and to a sump fill line 13a. To ensure that oil does not accumulate in the transmission, the scavenge pump 7b is sized larger than the scavenge motor section 7a, and thus the pump section is continuously trying to remove more oil from the sump than the amount being supplied.

In order to prevent air from being drawn into the scavenge pump due to this condition of excess capacity in the scavenge pump section, an oil level control unit 55 controls the level of oil in the sump to maintain it above the line 51. Preferably, this control system 55 operates to control the amount of fluid returning to the sump via sump fill line 13a. Oil from the scavenge pump outlet is pumped under pressure of 40 psi maximum and 20 psi minimum via line 13b into the hydrostatic drive cooler 2a, thence to the reservoir 2b. Sump fill line 13a joins the scavenge pump outlet to an orifice 14 of the sump. The orifice 14 is closed off by a rubber disc 16, which is connected to a pivotally mounted float 17. The orifice is sized such that the force on the disc due to the 40 psi maximum pressure is not greater than the force exerted by a combination of the buoyancy of the float at approximately 80% immersion in the oil and the mechanical leverage of the float arrangement.

At 20 psi minimum, the force exerted on the disc by the float is equal to about 30% immersion in the oil, which presents a level difference in the transmission sump of approximately one-half inch.

In operation, the scavenge unit motor at 2-gpm oil supply causes the pump section to draw oil from the sump at the rate of approximately 2½ gpm when motor and pump efficiencies are taken into account. Therefore, the oil level control unit returns oil to the sump at the rate of ½ gpm to maintain a constant volume in the sump and prevents air contamination of the hydrostatic oil since the oil will be maintained at a level above the line 51 to the inlet of the scavenge pump section.

While the preferred embodiment of the invention has been illustrated and described, it should be understood that variations will be apparent to one skilled in the art without departing from the principles herein. Accordingly, the invention is not to be limited to the specific embodiment illustrated in the drawings.

What is claimed is:

1. A remote lubrication system from a high-volume hydrostatic pump and motor drive system on a winch or the like having a high-volume pump, a fluid reservoir, a fluid motor remotely located from the pump and driven by the high-volume fluid from the pump, and a winch transmission attached to and driven by the motor, the improvement comprising:
    a bypass line coupled to the pump and having a flow reducer,
    a scavenge unit having a scavenge motor driven from the fluid through the flow reducer and a scavenge pump driven by the scavenge motor,
    a lubrication line carrying the fluid from the scavenge motor to the winch transmission for lubricating the transmission,
    a sump for collecting fluid from the transmission, said pump having a discharge line coupled to the scavenge pump inlet,
    a reservoir return line coupling the scavenge pump outlet to the high-volume pump reservoir, and
    control means maintaining the sump discharge line free of air which could contaminate the high-volume pump hydrostatic system.

2. The system of claim 1, said control means including a float for determining the level of fluid in the sump, said sump discharge line being connected at a low point in the sump, said reservoir return line coupled to the scavenge pump outlet having a sump fill line coupled to a high point in the sump, and valve means responsive to the fluid level in the sump for controlling the ratio of fluid directed to the sump and to the reservoir to maintain the level of fluid in the sump above the sump discharge line.

3. The system of claim 1, said lubrication line from the scavenge motor to the transmission including a valve control powered by the fluid in said lubrication line.

4. The system of claim 2, said valve means controlling fluid level in the sump including an inlet orifice and a closure member directly coupled to the float for controlling flow through the orifice whereby reduction of flow through the orifice will increase the flow to the reservoir and vice versa.

5. The system of claim 1 or 4 in which the fluid flow capacity of the scavenge pump exceeds the fluid flow capacity of the scavenge motor.

6. A lubrication system from a high-volume hydrostatic pump and motor drive system on a winch or the like having a high-volume pump, and a pump reservoir, a fluid motor driven by the high-volume fluid from the pump, a winch transmission attached to and driven by the motor and lubricated by power fluid from the hydrostatic pump and motor drive system, the improvement comprising:
    a sump below the transmission for collecting fluid from the transmission, said sump having a discharge line located low on said sump and coupled to the high-volume pump reservoir,
    means producing a pressurized flow of fluid from the sump through the discharge line and to the high-volume pump reservoir,
    a lubrication line carrying a part of the fluid from the high-volume pump to the winch transmission for lubricating the transmission, and
    control means responsive to flow out of the sump for maintaining the discharge line free of air which could contaminate the high-volume hydrostatic pump and motor drive system.

7. The system of claim 6, said control means including a float for determining the level of fluid in the sump above the discharge line, an orifice in said sump responsive to being closed by said float for regulating the amount of fluid to be maintained in the sump, a sump fill line coupled to a high point in the sump, and said orifice and float being responsive to the fluid level in the sump for controlling the ratio of fluid directed to the sump and to the reservoir to maintain the level of fluid in the sump above the sump discharge line.

8. The system of claim 7, and including a closure member directly coupled to the float for controlling flow through the orifice, whereby reduction of flow back into the sump through the orifice will increase the flow to the reservoir and vice versa.

9. A lubrication system for a high-volume hydrostatic pump and motor drive system on a winch or the like having a high-volume pump, and pump reservoir, a fluid motor driven by the high-volume fluid from the pump, a winch transmission attached to and driven by the motor and lubricated by power fluid from the hydrostatic pump and motor drive system, the improvement comprising:
    a sump below the transmission for collecting fluid from the transmission, said sump having a discharge line located low on said sump and coupled to the high-volume pump reservoir,
    means producing a pressurized flow of fluid from the sump through the discharge line and to the high-volume pump reservoir,
    a lubrication line carrying a part of the fluid from the high volume pump to the winch transmission for lubricating the transmission, and
    control means responsive to the variations in the level of the fluid in the sump for controlling the net outflow of fluid from the sump above the discharge line so as to maintain the discharge line free of air which could contaminate the high-volume hydrostatic pump and motor drive system,
    said control means including a float for determining the level of fluid in the sump above the discharge line, an orifice in said sump responsive to being closed by said float for regulating the amount of fluid to be maintained in the sump, a sump fill line coupled to a high point in the sump, and said orifice and float being responsive to the fluid level in the sump for controlling the ratio of fluid directed to the sump and to the reservoir to maintain the level of fluid in the sump above the sump discharge line, a scavenge unit having a scavenge motor driven from the power fluid through a flow reducer, and a scavenge pump driven by the scavenge motor, the sump fill line being coupled to an outlet of the scavenge pump, said scavenge pump being the pressurizing means for producing a pressurized flow from the sump to the high volume pump reservoir and being coupled to the sump discharge line.

10. The system of claim 8, said lubrication line from the high-volume pump to the transmission including a clutch control pressurized by the fluid in said lubrication line.

11. The system of claim 9 in which the fluid flow capacity of the scavenge pump exceeds the fluid flow capacity of the scavenge motor.

* * * * *

UNITED STATES PATENT AND TRADEMARK OFFICE
CERTIFICATE OF CORRECTION

PATENT NO. : 4,759,745

DATED : July 26, 1988

INVENTOR(S) : Leslie J. Sell

It is certified that error appears in the above-identified patent and that said Letters Patent is hereby corrected as shown below:

In claim 1, column 3, line 44, delete "pump" and substitute therefor --sump--.

Signed and Sealed this

Twenty-fifth Day of April, 1989

Attest:

DONALD J. QUIGG

Attesting Officer

Commissioner of Patents and Trademarks